United States Patent [19]

Armstrong et al.

[11] 4,124,538
[45] Nov. 7, 1978

[54] CATALYST COMPRISING IR OR IR AND RU FOR HYDRAZINE DECOMPOSITION

[75] Inventors: Warren E. Armstrong, Lafayette; Lloyd B. Ryland, El Cerrito; Hervey H. Voge, Berkeley, all of Calif.

[73] Assignee: Shell Oil Company, Houston, Tex.

[21] Appl. No.: 371,879

[22] Filed: May 28, 1964

[51] Int. Cl. ................................................ B01j 11/08
[52] U.S. Cl. ............................ 252/466 PT; 60/218; 60/219; 149/36; 252/472
[58] Field of Search .................... 60/35.4, 218, 219; 149/36; 252/466, 466 PT, 472

[56] References Cited

U.S. PATENT DOCUMENTS

| 3,055,840 | 9/1962 | Knoch, Jr. | 252/466 |
| 3,086,945 | 4/1963 | Cohn | 60/35.4 |
| 3,098,351 | 7/1963 | Higgins | 60/35.4 |
| 3,116,313 | 12/1963 | Fierce | 252/466 |
| 3,165,382 | 1/1965 | Forte | 252/466 |

*Primary Examiner*—Leland A. Sebastian

EXEMPLARY CLAIM

1. A catalyst for hydrazine decomposition consisting essentially of a carrier having a pore volume of at least 0.1 cubic centimeters per gram and a specific surface area, measured in square meters per gram, equal to 195 $(C_p + 0.013 + 0.736 V_p)$ where $C_p$ is the specific heat capacity of the carrier at about 25° C in calories per gram per degree and $V_p$ is the pore volume of the carrier in cubic centimeters per gram and metal of the group consisting of iridium, and mixtures consisting of iridium and ruthenium deposited on said carrier in an amount between 20% and about 40% by weight of the catalyst and distributed through the pores thereof in discrete particles sufficiently separated from each other so that they do not sinter or fuse together when the catalyst is at hydrazine decomposition temperature.

7 Claims, No Drawings

CATALYST COMPRISING IR OR IR AND RU FOR HYDRAZINE DECOMPOSITION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to the catalytic decomposition of hydrazine and deals with a new and more advantageous catalyst for promoting this decomposition. The invention also deals with an improved method for decomposing hydrazine and alkyl-substituted hydrazines using these novel catalysts.

Hydrazine and lower alkyl-substituted hydrazines are useful as monopropellant fuels for rockets and other thrust devices. They decompose with the liberation of heat and energy, and can be used for generation of gas for driving turbines as well as for operation of attitude control jets for rockets, space-craft, and the like. The catalysts which have been suggested for use in promoting these decompositions have serious drawbacks. Platinum group metal catalysts, for example, are proposed in U.S. Pat. Nos. 3,081,595 and 3,086,945 for instance. As heretofore prepared, these catalysts do not meet all the exacting requirements for successful use in thrust devices and gas generators. These requirements include ability to initiate the hydrazine decomposition at relatively low temperatures, for example, catalyst temperatures as low as 0° F. with liquid hydrazine at as low as 35° F. The catalyst must also be capable of at least ten firings of one minute each from cold starts with less than 100 milliseconds delay, and no appreciable overpressure at the start. The catalyst should furthermore be resistant to temperatures of the order of 2000° F. often encountered in hydrazine decomposition. It must have adequate physical strength to withstand the treatment encountered in rocket applications, and should be operable after about a year in a space environment. These are essential requirements which are not all met by hydrazine decomposition catalysts prepared by the conventional prior methods.

An important object of the present invention is the provision of a catalyst which meets the foregoing requirements in the decomposition of hydrazine and substituted hydrazines, hereinafter referred to collectively as hydrazines. Since hydrazine is a relatively stable chemical that can be stored in unvented tanks for long periods of time, a very active catalyst is necessary for spontaneous ignition at the high flow rates employed in rocket engines. Additionally, since the temperature reached in hydrazine decomposition is high relative to that in normal catalytic processes, the catalyst must possess exceptional stability if it is to have the capability of many restarts. The new catalysts meet these requirements and have a long effective life as spontaneous catalysts for decomposition of hydrazines, a spontaneous catalyst being one which will initiate and maintain decomposition of hydrazines when injected into the catalyst at the high rates used in rocket engines and gas generation chambers. Still other advantages of the new catalysts will be apparent from the following description of the invention in which some of the suitable catalysts are illustrated by representative examples which are to be understood as not restricting the broader scope of the invention.

It has been found that a special type of iridium metal catalyst deposited in a particular manner and in a critical high concentration on a special form of support has a unique combination of properties which makes it meet the foregoing exacting requirements as to high activity and good stability needed for an improved catalyst for decomposition of hydrazines. The new catalysts have as an essential component a carrier having a specific surface area, $S_s$, in square meters per gram, given by the equation $$S_s \geqq 195 (C_P + 0.013 + 0.736 V_p)$$

where $C_P$ is the specific heat capacity of the carrier at about 25° C. in calories per gram per degree C., and $V_p$ is the pore volume in cubic centimeters per gram. $V_p$ should not be below 0.1. With a carrier of this kind, not only will there be adequate pore volume for application of the required amount of catalytic metal essential in the new catalysts without restricting the pores so as to interfere with contact of hydrazines with the catalytic metal, but also there will be a desirable average temperature rise of at least 20° C. from the heat of wetting of the porous catalyst volume when the pores are filled with liquid hydrazine at the instant of starting. With the new catalysts made with carriers of this kind, smooth spontaneous decomposition of hydrazines is obtained even under adverse starting conditions.

Iridium has outstanding advantages as the catalytic metal in the new catalysts, not only when used as the sole catalytic metal, but also in its especially effective combinations with ruthenium. In these combinations it is desirable to employ about 30 to 80 atom percent of iridium in the mixture with ruthenium. In order that the catalyst have the desired high activity for spontaneous decomposition of hydrazines, it is essential that the iridium or a mixture of iridium and ruthenium be present in an amount between 20% and about 40% of the weight of the final catalyst. This metal must be properly dispersed on the surface of the carrier if the catalyst is to have the stability which enables the new catalysts to be used successfully for many successive starts. The metal or metals must be deposited as discrete particles sufficiently separated from each other so that they do not sinter of fuse together at the high temperatures reached in decomposing hydrazines. Most desirably the catalytic metal is uniformly distributed over the surface of the carrier in particles of about 10 to about 100 Å in diameter which are separated from each other by an average of about 20 Å to about 200 Å. Most advantageously the catalytic metal is present in particles of about 20 Å diameter, separated by about 50 Å from each other. Here separations are understood to mean idealized distances measured along surfaces, and not direct distances cutting across pore walls.

The required distribution of catalytic metal cannot be obtained by conventional methods of catalyst manufacture. It is necessary to use special methods which avoid the more or less uniform, continuous coating of catalyst carriers with metal which would be encountered if prior methods of making hydrazine decomposition catalysts were applied. It is necessary to diffuse the required amount of the indicated metal or mixture of metals deep within the pores of the chosen carrier, and then to build outward from the deep interior a heavier and heavier concentration of the metal or metals until the concentration is quite heavy in the exterior portion of the carrier, particularly the peripheral skin portion of about 0.5 mm thickness of the carrier particles. The carrier, which advantageously is in the form of spheres or cylindrical pellets, although other shapes or forms are suitable, should not be so excessively loaded with metal in this "skin" portion as to interfere unduly with the penetration of the hydrazines which are to be decomposed. It appears likely that most of the hydrazine decomposition takes place in the "skin" of the pellet, say 0.1–0.5 mm thick. The penetrated metal (or metals) probably serves two purposes: (1) it aids in heat transfer throughout the pellet, thus reducing the sudden thermal shock on the insulator support; and (2) continues to catalyze the reaction after minor amounts of the more heavily metal loaded exterior surface gradually erode off on successive firings.

One particularly advantageous procedure for producing the new catalysts makes use of repeated impregnations of the carrier with dilute solutions of a salt of iridium with or without a ruthenium salt. In each impregnation the metal-carrying ions are adsorbed onto the carrier surface. If a concentrated solution is used the metal ions cluster in high concentrations and the resulting metal particles formed after decomposition and reduction are too large or too close together. If the dilute impregnation is followed merely by drying, seed crystals are left which cause the next deposit to be laid down at the same sites so the same difficulties are encountered as in the use of solutions of too high concentration. Therefore it is necessary to apply a treatment which alters the metal ions before the next impregnation with the dilute solution. The treatment also must be one which prevents re-solution of salt deposited during the following impregnation and which favors deposition at points on the carrier surface which have not been previously covered. In this multiple impregnation treatment, for best ultimate catalyst performance, it is beneficial to degas the support pellets by evacuation during some of the early impregnations, thus achieving better penetration of the salt solution.

Techniques for achieving good metal distribution vary with the type of metal salt (or salts) used, the ion species present, and their distributions. These in turn are affected by the nature of the solvent, pH, salt concentration, and whether or not the salt solutions were "aged" before use. It is important that conditions be adjusted so that deep penetration of the pellet be achieved at the beginning of the multiple impregnations, and that in these early stages a heavy exterior coating should not be formed which thwarts this objective.

In this multiple impregnation method it is advantageous to use for the impregnations, a solution of a metal salt which can be decomposed by heating at a temperature below about 450° C., and to thermally decompose in this way the deposited salt after each impregnation. Among the suitable salts of iridium, and ruthenium which can be used in this way, are, for example, $H_2IrCl_6$, $H_3IrCl_6$, $HIrCl_2(OH)_2$, $IrCl_3 \cdot H_2O$, $(NH_4)_3IrCl_6$, $(NH_4)_2IrCl_5(H_2O)$, $[Ir(NH_3)_4Cl_2]Cl$, $[Ir(NH_3)_5(H_2O)]Cl_3$, $RuCl_3$, $H_3RuCl_6$, $(NH_4)_3RuCl_6$, and $[Ru(NH_3)_4Cl_2]Cl$. Especially advantageous results have been obtained with the chlorides. Particularly useful for making the preferred iridium catalysts are hexachloriridate ($H_2IRCl_6$), strongly acidic solutions of iridium trichloride such as $IrCl_3 \cdot 3HCl$ or $H_3IrCl_6$, and iridium trichloride hydrate. Mixtures of ruthenium trichloride with any of these iridium salt solutions make especially advantageous impregnants for use in preparing catalysts having these two metals on the carrier.

Solutions of the chosen metal salt or salts in water alone, or aqueous or anhydrous alcohols such as, for instance, as the water miscible alcohols methanol, ethanol, isopropyl alcohol, tertiary butyl alcohol, etc., are useful for the multiple impregnations. As a general rule solutions will contain salts in an amount providing about 0.02 to about 1 gram atoms of the required metal or metal mixture per liter; more advantageously about 0.1 to about 0.6 gram atoms per liter are suitable.

It has been found that iridium-containing catalysts of more satisfactory over-all performance in the decomposition of hydrazines result if the alcoholic or aqueous solutions are aged before being used to impregnate the carrier. Not only are the solutions more homogeneous and therefore more suitable for uniform distribution of the catalyst metal throughout the carrier, but also the metal ions are often less strongly adsorbed from the aged solutions and so are able to penetrate the carrier pellets more gradually and be deposited more uniformly on the interior surface area throughout the pellets. This is illustrated in tests carried out on the adsorption of aqueous $IrCl_3$ solutions containing about 0.02 gram iridium per ml and 0.15 M with respect to added HCl, on an alumina carrier. Overnight standing produced a homogeneous solution. Particles of the alumina carrier, having 156 square meter surface area per gram, a pore volume of 0.343 ml per gram, a specific heat capacity at 20° C. of 0.18 calories per gram per ° C. and a size range of 100–200 mesh were packed into a 1-mm ID column to form a bed 8 to 9 inches deep, over which the iridium chloride solution was poured. After passage of the aged solution, the alumina column was light pale green for 1 1/16 inches, blue to pale green for the next 2¾ inches, and then light yellow for the next ¼ inch. This shows a rather weak adsorption and verifies the observation that rapid penetration of pellets occurs with this type of salt solution. More concentrated acid caused further spreading out (or tailing) of the color bands and more dilute acid, less spreading out. Catalytically the best results with $IrCl_3$ alone were obtained with the dilute acid-type solution. Absorption of $H_2IrCl_6$ from isopropyl alcohol solution on the same support showed similar results. With a fresh solution very strong adsorption took place, the iridium being substantially taken up at the head of the column where a dark species formed a ½-inch band. With aged solutions only a trace of the dark species was present at the beginning of the column, and there was an extensive pale green colored band. Thus the aged, less strongly adsorbed ions were able to penetrate the alumina more deeply. In catalyst preparation this causes the metal to be more uniformly deposited in the interior pores.

The mechanism whereby the more advantageous catalysts are produced through the use of aged solutions has not been fully determined. In the case of the alcoholic solutions it may be that a reduction of catalyst metal ions to species such as $Ir^{3+}$ takes place, or that a slow formation of a complex ion occurs. Whatever the explanation for the improvement, it is usually desirable that the solutions used for the impregnation be aged for at least about 24 hours prior to application to the chosen catalyst carrier. Fresh solutions may deposit strongly in a thick coating on the peripheral surface of the pellets and thus the desired deep penetration may not be achieved on successive impregnations.

As previously pointed out, the pH of the impregnating solution has influence on the deposition of the catalyst metal or metals on the surface of the carrier. With iridium salts such, for instance, as iridium trichloride hydrate, hexachloriridate and iridium tetrachloride, an acidic pH in the range of about 0.5 to about 4 is desirable, with a pH of about 2 to about 3 being more advantageous in the solution. There is some increase in pH of the residual aqueous hexachloriridate solutions after the first successive impregnation of the alumina pellets. Thus hydrogen ion as well as the iridiumcontaining ionic species is adsorbed or reacted with the alumina. The equilibrium probably shifts toward polymeric iridium species because of the decrease in hydrogen ion concentration. Gradual thickening of the solutions has been observed after many impregnations. This again emphasizes the importance of deep penetration of the pellets early in the sequence of successive impregnations.

However, alkaline solutions may be used when amine complexes of the metals are employed. Thus there are advantages in using solutions of iridium chloropentamine for the multiple impregnation of the carrier, and in this case ammoniacal solutions having a pH in the range of about 8 to about 10 are suitable.

In one successful method of carrying out the multiple impregnations, the chosen catalyst carrier is immersed in the solution of catalyst metal salt for a period of the order of about 10 to about 60 minutes until adequate penetration of the pores of the carrier has taken place. The excess solution is then drained off in about 1 to about 20 minutes, and the carrier is dried in a current of warm air, preferably at about 120° to about 150° C. The partially dried carrier particles are then heated gradually to about 250° to about 450° C. to complete the drying and effect partial decomposition of the catalyst metal salt. Usually about 10 to about 60 minutes is sufficient to complete this operation, after which the carrier is cooled and the same series of treatments is repeated until the required amount of catalyst salt has been deposited to provide the necessary proportion of catalyst metal upon subsequent reduction as previously indicated. Usually at least seven separate impregnations will be required, and generally it will be found to be more economical to operate with a single batch of impregnating solution which is reused until completely taken up by the carrier. However, one can also continuously or intermittently add fresh catalyst metal salt solution to the solution being applied to the carrier, or operate in other ways which give the desired deposition of catalyst metal described previously.

For final reduction of the deposited decomposition products of the starting metal salt or salts one can successfully use gaseous hydrogen at about 250° to 600° C. More generally it is preferable to begin the reduction with hydrogen diluted with nitrogen at about 300° C. and increase the temperature and hydrogen concentration in the gases until the reduction is completed by heating at about 550° C. for about 30 minutes with undiluted hydrogen.

The following examples further illustrate suitable methods for making the new catalysts and show some of their advantages.

EXAMPLE I

The preparation of an iridium on alumina catalyst by multiple impregnation of the carrier with an ammoniacal solution of $IrCl_3$ was carried out as follows:

Ammoniacal solution containing 9.2 g Ir/100 ml was prepared by dissolving 25.0 g of iridium trichloride containing 54.6% Ir in 85 ml $H_2O$ by heating to 50° C., cooling, and adding 60 ml 3 N $NH_4OH$. The alumina carrier had a surface area of 156 square meters per gram, a pore volume of 0.34 cc/g, and was in the form of cylindrical pellets of ⅛-inch diameter. The crushing strength of individual pellets, measured between flat plates, averaged 17 pounds. Fifty-five grams of carrier was soaked ten minutes in the above solution, drained five minutes, predried 2 to 5 minutes with a hot air stream and then dried 15 minutes in a single layer in a 6-inch petri dish on a hot plate on high setting. In addition, the hot air stream from a 20-amp heat gun was directed on the catalyst from a distance of 10 inches. The catalyst reached a temperature of about 380° C. and acid and ammonium chloride fumes were evolved. The material was cooled and weighed.

This procedure just described was carried out for a total of six times to consume all of the solution. The pellets were then heated in dry nitrogen to 300° C. and reduced with a mixture of $N_2$-$H_2$ (~1:10) which was passed over the catalyst at 300° C. for ½ hour, during which period much HCl was given off. The pellets were cooled in $N_2$ and then allowed to oxidize by exposure to air. The pellets were then washed with three 100-cc portions of water. A small amount of aluminum chloride (probably oxychloride) was removed but no ammonium chloride was detected. The washing step may be unnecessary and was carried out in this case to remove any undecomposed ammonium chloride (none was detected). The pellets were dried on the hot plate.

The pellets were then treated for a second series with a freshly prepared ammoniacal iridium trichloride solution as already described. This series also required six treatments to adsorb all the solution. The reduction and washing were carried out as described above and then the final catalyst was again heated to 300° C. in $N_2$ followed by ½ hour in $N_2/10H_2$ at 300° C. and finally ½ hour in $H_2$ at 550° C.

This catalyst had an iridium content of 32% w. In tests of hydrazine decomposition in a five-pound thrust reactor having a cylinder 1.04 inches inside diameter by 3.5 inches long at 3° to 5° C. feed temperature and a feed rate of 13.6 grams of hydrazine per second, quite good firing was observed. The ignition delay in ten starts with the reactor at 2° to 4° C. was initially less than 25 milliseconds, increasing to 90 milliseconds at the end of the series. Steady pressures of 185-192 psig were recorded and there were no overpressures at the start. The ammonia decomposition was 57 to 62% and the catalyst loss as fines was about 1% per minute of firing.

EXAMPLE II

The need for using more than seven impregnations in preparing the catalysts is shown by the following results obtained with iridium on alumina catalysts prepared by the following method.

Catalysts were prepared by soaking alumina pellets of the type described in Example I in separate aqueous acidic solutions of $H_2IrCl_6$ for 1 hour. The pellets were drained, dried by means of a hot air stream and then decomposed in air at 380° C. for about 1 hour. The above described procedure was repeated 5 times for catalyst A using a solution with an iridium concentration of 22 grams of Ir per 100 ml, and 20 times for catalyst B where the concentration of the impregnating solution was 6 grams of Ir per 100 ml. After the final impregnation and decomposition each catalyst was reduced in a stream of hydrogen at 500°-550° C. The results obtained are shown in the following table where the hydrazine decomposition test referred to were carried out in the five-pound thrust reactor described in Example I.

| Catalyst | A | B |
|---|---|---|
| Number of Impregnations | 5 | 20 |
| Iridium Content of Finished Catalyst, % W | 32 | 33 |
| Hydrogen Chemisorption, micromoles per gram | 100 | 370 |
| Catalyst Activity | Fair | Good |
| Ignition Delay, milliseconds at Shot Number 10 in hydrazine decomposition | 127 | 80 |
| Catalyst Loss Rate, percent per minute | 2.4 | 0.8 |

The great difference in hydrogen chemisorption observed shows the great difference in the state of subdivision of the deposited metal. The smaller the size of the deposited metal particles, the greater will be the area available for hydrogen chemisorption and also for catalytic activity in decomposition of hydrazines. The catalyst made by five impregnations had an iridium surface area only about one-fourth of that of the catalyst made by twenty impregnations even though the total iridium content was approximately the same. The average metal particle diameter was about 17 angstroms in the catalyst made by twenty impregnations which resulted in greatly superior hydrazine decomposition.

EXAMPLE III

The following data shows the excellent results obtained with a catalyst prepared from an aqueous hexachloridate solution aged overnight before impregnating the same alumina support described in Example I. The alumina had been muffled at 700° C. for 1 hour. The impregnating solution contained 0.29 gr. atom Ir/liter and was about 0.3 N in added hydrochloric acid. A total of 20 successive impregnations and decomposition were made with the impregnation times varying from 5–10 minutes to 16 hours to achieve the desired metal salt penetration into the pellets. The reduced catalyst contained 35% iridium metal.

In the five-pound thrust reactor motor described in Example I, the ignition delay in ten starts with the reactor at 2° to 4° C. was initially less than 40 milliseconds, increasing to 80 milliseconds at the end of the series. Steady pressures of 185–189 psig were recorded and there were no overpressures at the start. The catalyst loss as fines was only 0.5% per minute of firing.

EXAMPLE IV

The usefulness of other iridium salt solutions as impregnants in preparing the new catalysts is shown by the following results obtained with catalysts made by the general method of Examples II and III using the same alumina support and solutions with 0.29 gr atom Ir/liter. The number of successive impregnation varied from 17 to 20 and the deposited salt was decomposed by heating after each impregnation. These catalysts contained 30 to 35% wt iridium on the ⅛-inch pellets which were used in a 45-cc bed for hydrazine decomposition with a hydrazine feed rate of 13.6 grams per second. Starting temperatures were 2° to 4° C. for both feed and catalyst, and each firing was of 60 seconds duration.

| Impregnating Solution | No. of Firings | Ignition Delay Range, (milliseconds) | Catalyst Loss, % per minute |
|---|---|---|---|
| $IrCl_3$ in aqueous 0.02 N HCl | 6 | 25–30 | 1.0 |
| $H_2IrCl_6$ in isopropyl alcohol | 7 | 20–30 | 0.9 |
| $H_2IrCl_6$ in aqueous HCl | 10 | 20–45 | 0.3 |
| $IrCl_3$ in Water | 10 | 60–125 | 0.8 |
| $H_2IrCl_6$ in aqueous HCl | 10 | 20–40 | 0.5 |
| $H_2IrCl_6$ in aqueous HCl | 10 | 20–80 | 0.5 |

EXAMPLE V

The results obtained with catalysts made with mixtures of iridium and ruthenum metals applied to the alumina support of Example I in the same general way as in Examples II and III and tested for hydrazine decomposition as described in Example I, are as follows. In all cases the catalysts contained 25–32% of ruthenium plus iridium, and over ten impregnations were used in their preparation.

| Impregnating Solution | Ru/Ir Atomic Ratio | No. of Firings | Ignition Delay Range, (milliseconds) | Catalyst Loss, % per minute[c] |
|---|---|---|---|---|
| $RuCl_3$ in 10% $H_2O$-90% IPA[a] $H_2IrCl_6$ in 0.15 N HCl (aq.) | 0.2[b] | 13 | 89–117 | 0.6 |
| $RuCl_3$ in 10% $H_2O$-90% IPA $IrCl_3$ in 0.3 N HCl (aq.) | 0.3 | 8 | 20–145 | 1.5 |
| $RuCl_3$ in 10% $H_2O$-90% IPA $H_2IrCl_6$ in 1.5 N HCl (aq.) | 0.21 | 5 | 20–179 | 2.8 |
| $RuCl_3$ in 10% $H_2O$-90% IPA $H_2IrCl_6$ in 0.15 N HCl (aq.) | 0.21 | 3 | 80 | 1.5 |
| $RuCl_3$ in 10% $H_2O$-90% IPA $H_2IrCl_6$ in 0.15 N HCl (aq.) | 0.21 | 2 | 125 | 1.9 |

[a] Isopropyl alcohol.
[b] Prepared from alumina of surface area 80 $m^2/g$, pore vol. 0.29 cc/g, and final catalyst washed with 0.1 N HCl.
[c] Weight loss plus fine material passing a 10-mesh screen.

EXAMPLE VI

A hydrazine decomposition catalyst especially adopted for use in small control motors having only the low thrust (about 1 pound or less) needed for attitude control, supplemental vernier thrust and the like where periodically small amounts of hydrazine are to be decomposed was made by impregnating 16–28 mesh granules of the alumina carrier of Example I with 31% iridium according to the procedure described in that example, employing a similar solution of ammoniacal iridium trichloride and using seven impregnations averaging 15 minutes each.

This catalyst fired very well in a small reactor employing 2.3 cc of catalyst. At about 3° C. at least six 9-second shots using 8 ml hydrazing per shot were successfully made and equally good results were obtained on again firing repeatedly after the catalyst had stood in the reactor for 6 weeks.

While the use of alumina carriers has been emphasized in the foregoing examples because of their superiority in producing especially active and stable catalysts, it will be understood that the invention is not limited thereto, since advantageous new catalysts for the decomposition of hydrazines can be made with other carriers which have specific surface areas conforming to the previously given formula and adequate pore volume. These include, for example, zirconia, boron carbide, titanium nitride, zirconium nitride, boron nitride, zirconium carbide, carbon, zirconium boride, calcium zirconate, and like highly refractory carriers. Among aluminas, the highly stable forms derived from gels (such as gelatinous boehmite) are particularly advantageous.

The invention is also not limited to the decomposition of hydrazine but can be applied to the decomposition of substituted hydrazines such as monomethyl hydrazine, unsymmetrical dimethyl hydrazine and the like. It will thus be seen that the invention has many advantages and is capable of wide variation. It is not restricted to the examples which have been given by illustration nor by any theory proposed in explanation of the improvements which are achieved.

We claim as our invention:

1. A catalyst for hydrazine decomposition consisting essentially of a carrier having a pore volume of at least 0.1 cubic centimeters per gram and a specific surface area, measured in square meters per gram, equal to 195 $(C_p + 0.013 + 0.736 V_p)$ where $C_p$ is the specific heat capacity of the carrier at about 25° C. in calories per gram per degree and $V_p$ in the pore volume of the carrier in cubic centimeters per gram and metal of the group consisting of iridium, and mixtures consisting of iridium and ruthenium deposited on said carrier in an amount between 20% and about 40% by weight of the catalyst and distributed through the pores thereof in discrete particles sufficiently separated from each other so that they do not sinter or fuse together when the catalyst is at hydrazine decomposition temperature.

2. A catalyst in accordance with claim 1 wherein the carrier is an alumina having a surface area of about 100 to 300 square meters per gram, a pore volume of about 0.3 to about 0.5 cubic centimeters per gram, and a crushing strength of about 10 to about 30 lbs.

3. A catalyst in accordance with claim 2 wherein the metal on the alumina carrier is iridium only.

4. A catalyst in accordance with claim 3 wherein the metal on the alumina carrier is a mixture of about 30 to 80 atom percent iridium with the remainder ruthenium.

5. A process for producing a catalyst effective for spontaneous decomposition of hydrazine and capable of at least ten firings of one minute each from cold starts with less than 50 milliseconds delay and no appreciable overpressure at the start, which comprises introducing into the pores of a carrier having a pore volume of at least 0.1 cubic centimeter per gram and a specific surface area, measured in square meters per gram, equal to 195 $(C_p + 0.013 + 0.736 V_p)$ where $C_p$ is the specific heat capacity of the carrier at about 25° C. in calories per gram and $V_p$ is the pore volume of the carrier in cubic centimeters per gram, a solution of a salt of the group consisting of iridium salts and mixtures of salts of iridium and ruthenium which salt undergoes decomposition at a temperature below 450° C., said solution containing said metal in an amount between about 0.02 and about 0.6 gram atoms of said metal per liter and having a pH of about 0.5 to about 4, drying the solution-containing carrier to deposit said salt in the pores thereof, then heating the carrier to decompose the deposited salt, reimpregnating the pores of the carrier with said salt solution, again drying the carrier and decomposing the salt, repeating the impregnation of the carrier with said salt, the drying of the reimpregnated carrier and the decomposition of the deposited salt at least seven times until the catalyst contains about 20% to about 40% by weight of said metal, and heating the catalyst in a stream of hydrogen gas at a temperature between about 200° and about 500° C. to convert the decomposition products of the deposited salt to catalytically active metal.

6. A process in accordance with claim 5 wherein the impregnations of the carrier are carried out with metal salt solution which has been aged at least 24 hours prior to immersion of the carrier therein.

7. A process for producing a catalyst effective for spontaneous decomposition of hydrazine and capable of at least ten firings of one minute each from cold starts with less than 50 milliseconds delay and no appreciable overpressure at the start, which comprises immersing pellets of alumina having a pore volume of at least 0.1 cubic centimeter per gram and a specific surface area, measured in square meters per gram, equal to 195 $(C_p + 0.013 + 0.736 V_p)$ where $C_p$ is the specific heat capacity of the alumina at about 25° C. in calories per gram and $V_p$ is the pore volume of the alumina in cubic centimeters per gram, in an ammoniacal solution of an iridium salt which undergoes decomposition at a temperature below 450° C. which solution contains about 0.02 to about 0.6 gram atoms of iridium per liter and has an alkaline pH, drying the resulting alumina containing said solution to deposit the iridium salt in the pores thereof, then heating the alumina to decompose the deposited iridium salt, carrying out the series of steps of impregnation, drying and decomposition of the deposited iridium salt at least seven times until the alumina pellets contain about 20% to about 40% by weight of iridium, and then reducing the decomposed iridium salt to catalytically active metal by heating with hydrogen at about 200° C. to about 500° C.

* * * * *